United States Patent [19]
Welmecke

[11] 3,864,850
[45] Feb. 11, 1975

[54] TEACHING AID

[75] Inventor: August Philip Helmecke, Massapequa, L. I., N.Y.

[73] Assignee: Crocker Country Day School, Inc., Oceanside, N.Y.

[22] Filed: July 11, 1973

[21] Appl. No.: 378,353

[52] U.S. Cl. .............................................. 35/31 R
[51] Int. Cl. .......................................... G09b 19/02
[58] Field of Search .......... 35/9 R, 9 E, 31 R, 31 C, 35/31 D, 31 F, 31 G, 32, 30

[56] References Cited
UNITED STATES PATENTS

| | | | |
|---|---|---|---|
| 1,244,000 | 10/1917 | Soltoft | 35/31 G |
| 1,343,095 | 6/1920 | Smith | 35/9 R |
| 2,463,763 | 3/1949 | Graff | 35/31 D X |
| 3,422,547 | 1/1969 | Heine | 35/31 R X |
| 3,690,018 | 9/1972 | Arroyo | 35/31 C |

*Primary Examiner*—Wm. H. Grieb
*Attorney, Agent, or Firm*—Blum, Moscovitz, Friedman & Kaplan

[57] ABSTRACT

An improved teaching device of the type which employs coded cards and aids abstract learning through concrete application including at least one key card bearing printed data and a card holder therefor. An abstract printed problem is located on the top portion of the key card with a like abstract printed problem located on the body portion thereof followed by an answer key. A margin of the key card is provided with at least a pair of printed, color coded subsets correlatable with the abstract printed problem. The key card is selectively displayed in the card holder with the body portion thereof normally obscured from view, while the top portion thereof is normally displayed. The card holder is provided with means for displaying the key card body portion, as desired. Also provided is means for displaying at least a pair of companion color coded objects correlatable with the printed, color coded subsets.

7 Claims, 8 Drawing Figures

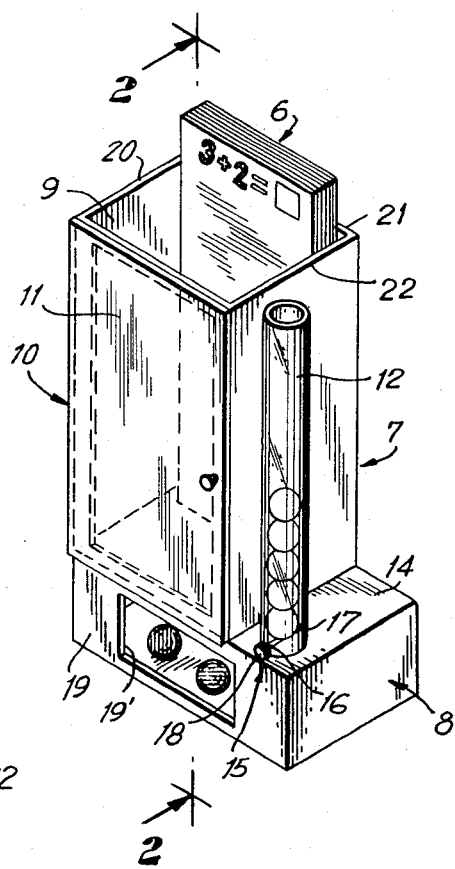
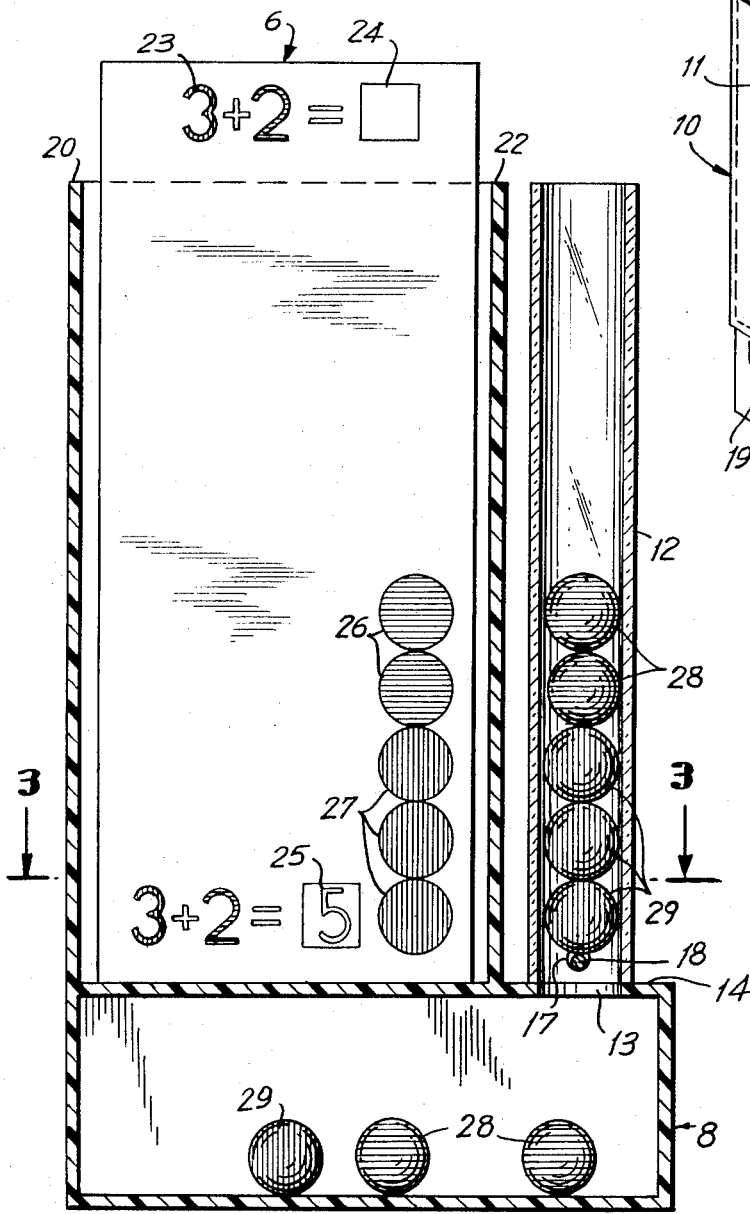

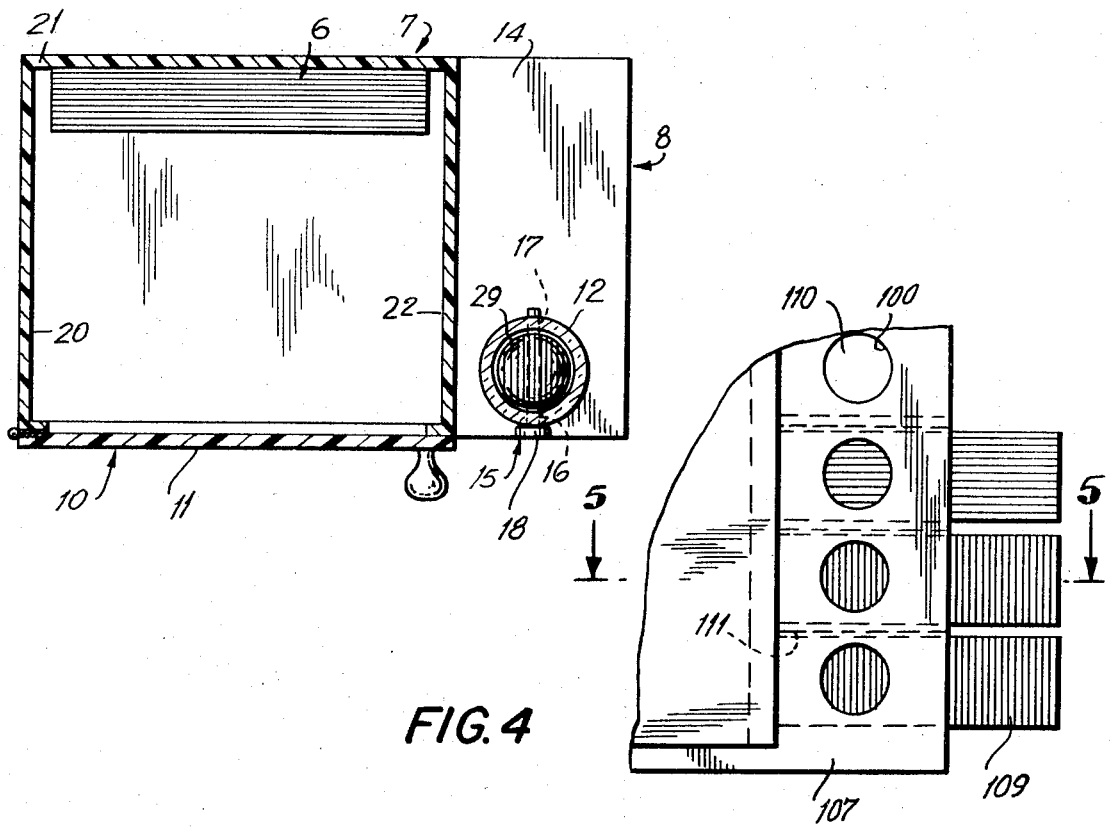
FIG. 3
FIG. 4
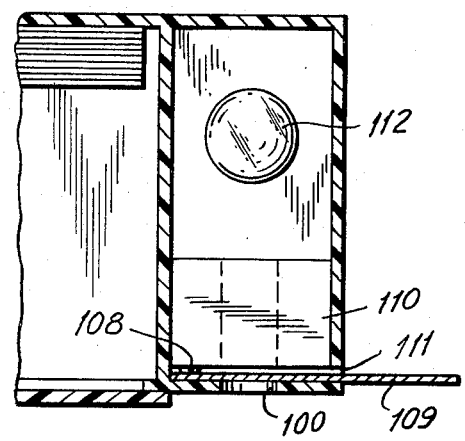
FIG. 5

ND AID

BACKGROUND OF THE INVENTION

The instant invention relates to an improved teaching device for teaching basic mathematical concepts to preschool and kindergarten children, as well as children of a somewhat older age who have experienced difficulty in learning simple mathematical concepts. More particularly, this invention relates to an improved teaching device of the type which employs coded key cards and aids abstract learning through concrete application.

The current trend in education towards individualized learning has stimulated a need for progressive teaching devices, games, aids and the like. Prior coded key card devices have not promoted an optimal learning growth rate. They either require much less than maximum potential from the user or are insufficiently intriguing to capture the users attention for long time spans.

Accordingly, this invention provides a learning tool for its user and yet it stimulates and amuses during the learning process. Displayed abstract concepts are self-taught through concrete application and the device provides a satisfactory intermix between concentration and manipulation.

SUMMARY OF THE INVENTION

Generally speaking, in accordance with the invention, an improved teaching device of the type which employs coded key cards and aids abstract learning through concrete application is provided which includes at least one key card bearing printed data and a card holder therefore. An abstract printed problem is located on the top portion of the key card with a like abstract printed problem located on the body portion thereof followed by an answer key. A margin of the key card is provided with at least a pair of printed, color coded subsets correlatable with the abstract printed problem. The key card is selectively displayed in the card holder with the body portion thereof normally obscured from view, while the top portion thereof is normally displayed. The card holder is provided with means for displaying the key card body portion, as desired. Also provided is means for displaying at least a pair of companion color coded objects correlatable with the printed, color coded subsets.

One embodiment of the device includes a rectangular frame mounted on a platform base. The frame has two open adjoining sides, a side wall and end wall, respectively. The frame is provided with a door mounted on hinges so that the open side wall of the frame may be opened or closed by an operator as desired to enclose or disclose an answer sheet upstanding within the frame. Mounted on the platform adjacent and parallel to the frame is an upstanding transparent tube adapted at one end to receive colored balls. The tube end mounted on the platform is provided with means for retaining balls within the tube or manually releasing the balls therefrom. The tube communicates with the platform which is hollow and balls released from the tube drop within the platform and the platform itself is provided with a slot through which balls may be manually extracted from within the platform.

The rectangular frame is adapted to receive a simple mathematical problem card somewhat longer than the length of the frame, whereby a portion of the problem card extends through the open end of the frame and above the frame. At the top of the card which extends above the frame is a simple mathematical problem with a blank answer. At the midportion of the card is again the same mathematical problem, but with the answer. Each member of the mathematical problem is a different color, for instance, if the problem is 5 + 4, the 5 may be in blue ink and the 4 in red ink. Along the marginal edge of the answer sheet parallel and aligned with the tube are a plurality of printed balls coinciding with the numerical answer to the problem The color of the printed balls coincides with the color of the balls themselves, and the color of each numerical member of the problem.

In practice, one or more problem sheets are placed in the frame and the door thereto is in a closed position. The problem appears at the top of the sheet unanswered and the child has to fill the tube with the number of colored balls corresponding to each numerical member of the problem. Thereafter, the child opens the door, checks each colored ball with the corresponding colored ball printed on the answer sheet and is provided with the numerical answer to the problem.

In an alternative embodiment of the device, the tube holder for the counting balls is replaced by a plurality of aligned shuttered apertures formed in the card holder. A slidable contact bar is provided for each corresponding aperture. At least a pair of companion color coded, translucent card strips are provided for displacing selected slidable contact bars to offset positions to thereby complete circuits which open corresponding shutters. Behind the shuttered apertures a light is mounted which illuminates the unshuttered apertures for thereby displaying the color coded translucent card strips.

Still other advantages of the invention will in part be obvious and will in part be apparent from the specification.

The invention accordingly comprises the features of construction, combinations of elements, and arrangement of parts which will be exemplified in the construction hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which:

FIG. 1 is a perspective view of one type of improved teaching device constructed in accordance with the invention;

FIG. 2 is an elevated, sectional view of the embodiment shown in FIG. 1 along the line 2—2;

FIG. 3 is a sectional plan view of the embodiment shown in FIG. 2 along the line 3—3;

FIG. 4 is a fragmentary detail of another embodiment of the invention;

FIG. 5 is a fragmentary sectional view of the embodiment shown in FIG. 4 along the lines 5—5.

DESCRIPTION OF THE PREFERRED EMBODIMENTS

Figure 6A:
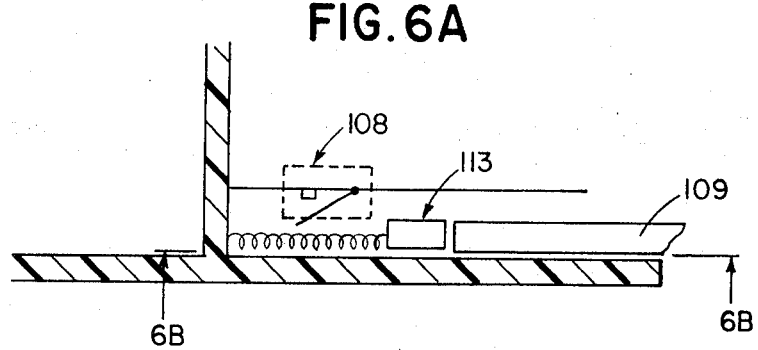
FIG. 6A is a top detail view illustrating a slidable contact bar and depressible switch therefor in connection with the embodiment of FIG. 4.
Figure 6B:
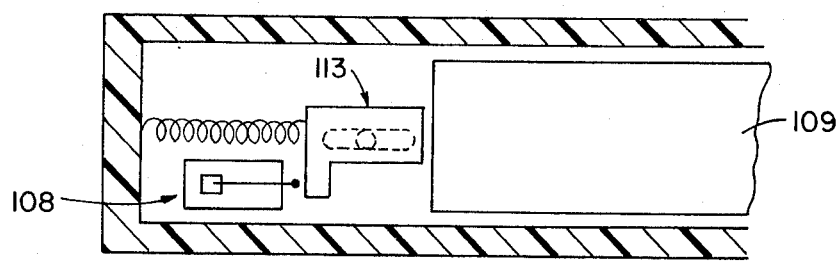
FIG. 6B is a front elevational view of the embodiment shown in FIG. 6A taken along line 6B—6B thereof.

Referring now to FIGS. 1 to 3, the device there shown includes a rectangular frame 7 for receiving a plurality of problem cards 6 bearing printed data and marked with a master code. An end of rectangular frame 7 is mounted on a platform base 8 and rectangular frame 7 upstands thereon providing a receptacle or card holder for problem cards 6. Card holder 7 is provided with two open adjoining sides 9 and 10, an end wall and a side wall respectively. On side wall 10, a door 11 is hingedly connected for viewing or obscuring from view the interior of card holder 7 as door 11 is opened or closed by the operator, as desired.

Mounted on platform base 8 adjacent and parallel to card holder 7 is an upstanding tube 12 adapted at one end to receive colored counting balls 28 and 29. Tube 12 communicates with the interior of platform base 8 through aperture 13 defined in top panel 14 of platform base 8. The tube end mounted on platform base 8 is provided with means 15 for selectively controlling communication between tube 12 and the interior of platform base 8. Means 15 includes a pair of opposed, aligned apertures 16 and 17 provided in tube 12 for receiving a headed pin 18 therethrough.

Front panel 19 of platform base 8 is provided with a slot 19' for recovering counting balls 28 and 29 released into the interior of platform base 8 when headed pin 18 is removed from apertures 16 and 17 of tube 12.

Problem cards 6 are somewhat longer than the length of card holder 7, whereby a portion of problem cards 6 extend through open end 9 of card holder 7 and that extended portion of problem cards 6 may be viewed. The interior of card holder 7 is somewhat wider than the width of problem cards 6, and side wall panels 20 and 22 together with back side panel 21 provide a guide for problem cards 6 and support problem cards 6 in proper registration within card holder 7.

While each of the problem cards 6 contains a different problem, the problem is set up in identical fashion on each card. At the visible, extended portion of the card is a printed mathematical problem 23 with a blank answer space 24. At the midportion of the card is again the same mathematical problem 23, but provided with the answer thereto 25. Each member of the mathematical problem is a different color, for instance as best seen in FIG. 2 where the problem is 3 + 2, the 3 may be in red ink and the 2 in blue ink. Along the marginal edge of problem sheet 6 parallel and aligned with tube 12 are a plurality of aligned printed balls 26 and 27 coinciding with the numerical answer 25 to the problem. The color of the printed balls 26 and 27 coincides with the color of the balls 28 and 29 and the color of each numerical member of mathematical problem 23.

In practice, one or more problem cards 6 are registered one with the other and stacked within card holder 7 with unanswered problem 23 visible above front side panel 10 of card holder 7. Door 11 hingedly connected on front side panel 10 is in a normally closed position. Problem 23 appears at the top of problem card 6 unanswered and the operator, a child, has to fill tube 12 with the number of colored balls 28 and 29 corresponding to each color coded numerical member of problem 23. Afterwards, door 11 is opened and the child may check each colored ball 28 and 29 with the corresponding printed colored ball 26 and 27 on problem card 6. In this fashion the child is provided with a concrete demonstrable answer to an abstract problem.

Figure 6C:
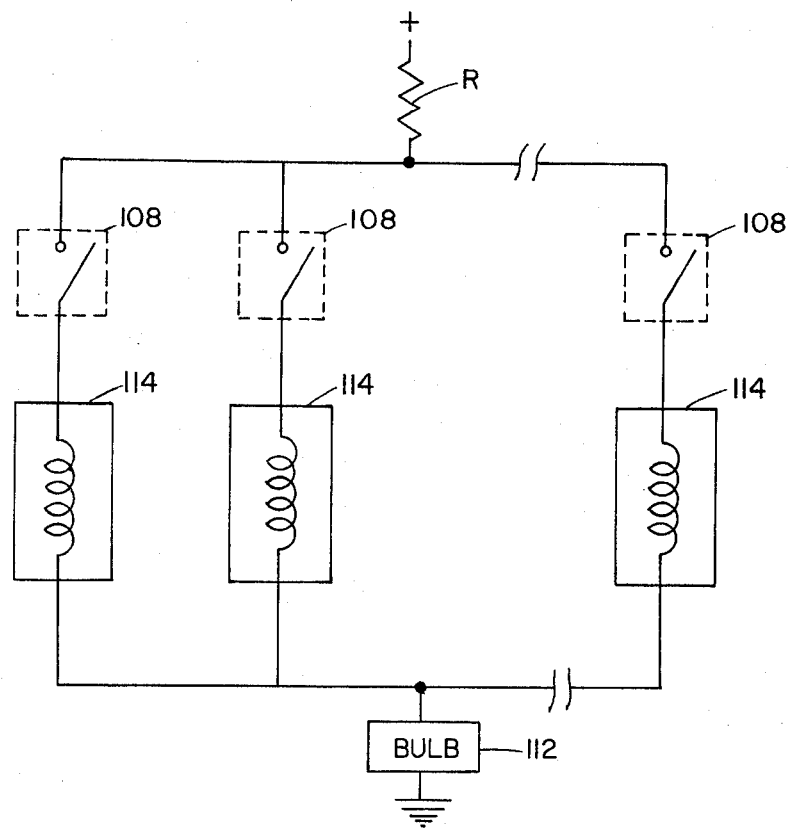
FIG. 6C is a schematic circuit for the embodiment shown in FIGS. 4—6B.

Referring now to FIGS. 4–6C where there is shown an alternate embodiment of the device in which tube holder 12 for counting balls 28 and 29 is replaced by a plurality of aligned shuttered apertures provided in card holder 107, a plurality of depressible switches 108 in card holder 107, each depressible switch 108 corresponding to a respective slidable contact bar 113 for each shuttered aperture 100 and at least a pair of companion color coded, translucent card strips 109 for displacing selected slidable contact bars 113 to offset positions and thereby completing at least a corresponding pair of circuits for opening shutters 110 corresponding thereto. Conventional circuity, as best seen in FIG. 6C, may be provided to accomplish the desired operation. For instance, each shutter 110 may be mounted by a hinge pin and provided with a spring which biases the shutter open. A solenoid actuated latch may be mounted in card holder 107 for maintaining shutters 110 closed against the force of the spring. To each shutter 110 a shutter release solenoid 114 may be connected via the contact bar and push button switch 108 to a battery and a current limiting resistor. When a colored card strip 109 is inserted in slot 111 provided therefor, switch 108 is depressed, current flows from the battery through the switch, and the closed contact sets the shutter release solonoid. The solenoid latch retracts and the shutter 110 opens under the force of the bias spring. Bulb 112 illuminates the area behind shuttered apertures 100 and release of a given shutter illuminates the card strip 109 overlying the aperture 100. In this alternate form of the device card strips 109 are colored to correlate with colored printed balls 26 and 27 imprinted on problem card 6 and apertures 100 are aligned therewith. In all other respects this embodiment of the device operates in the same way discussed in connection with the prior embodiment.

It will thus be seen that the advantages set forth above, among those made apparent from the preceding description, are efficiently attained and, since certain changes may be made in the above constructions without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. In a teaching device of the type which employs coded key cards and aids abstract learning through concrete application, the improvement comprising at least one key card bearing printed data and marked with a master code, said at least one key card being receivable in a card holder, said at least one key card including top and body portions, an abstract printed problem being located on said top portion thereof, a like abstract printed problem being located on said body portion thereof with an answer key thereto, at least a pair of color coded subsets correlatable with said abstract printed problem located on a margin of said body portion of said at least one key card, a card holder for selectively displaying said at least one key card, said at least one key card being insertable therein, said card holder normally obscuring from view said body portion of said at least one key card and normally displaying said top portion of said at least one key card, said card holder including means for displaying said body portion of said at least one key card, as desired, and means for displaying at least a pair of companion color coded objects correlatable with said color codes subsets, said last mentioned means being aligned with said key card margin on which said color coded subsets are located.

2. The improved teaching device of claim 1, including a platform base for supporting said card holder and said means for displaying at least a pair of companion color coded objects, said means communicating with the interior of said platform base, said platform base including a slotted front panel for extracting color coded objects therefrom.

3. The improved teaching device of claim 2, wherein said means for displaying at least a pair of companion color coded objects is a tube, an end of said tube being mounted on said platform base, said tube communicating with the interior of said platform base through an aperture provided in a panel of said platform base.

4. The improved teaching device of claim 3, including means for selectively controlling communication between said tube and said platform base interior.

5. The improved teaching device of claim 4, wherein said means for selectively controlling communication between said tube and said platform base interior includes a pair of opposed, aligned apertures in said tube, and a headed pin removably seated through said apertures.

6. The improved teaching device of claim 1, wherein said means for displaying at least a pair of companion color coded objects correlatable with said color coded subsets includes a plurality of aligned shuttered apertures in said card holder, a plurality of slidable contact bars in said card holder, and at least a pair of companion color coded, translucent card strips for displacing selected slidable contact bars to offset positions to thereby complete circuits for opening corresponding shutters.

7. The improved teaching device of claim 6, including means for illuminating unshuttered apertures for thereby displaying said color coded, translucent card strips.

* * * * *